Patented Nov. 19, 1946

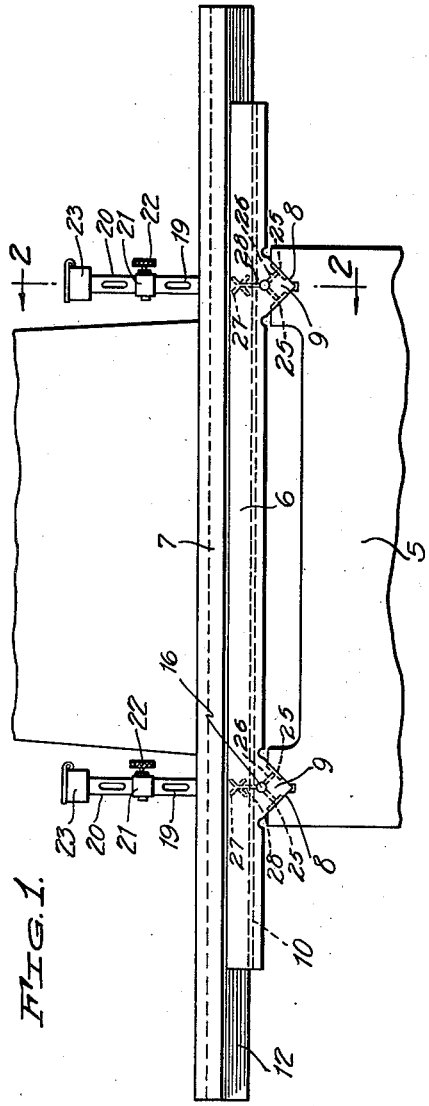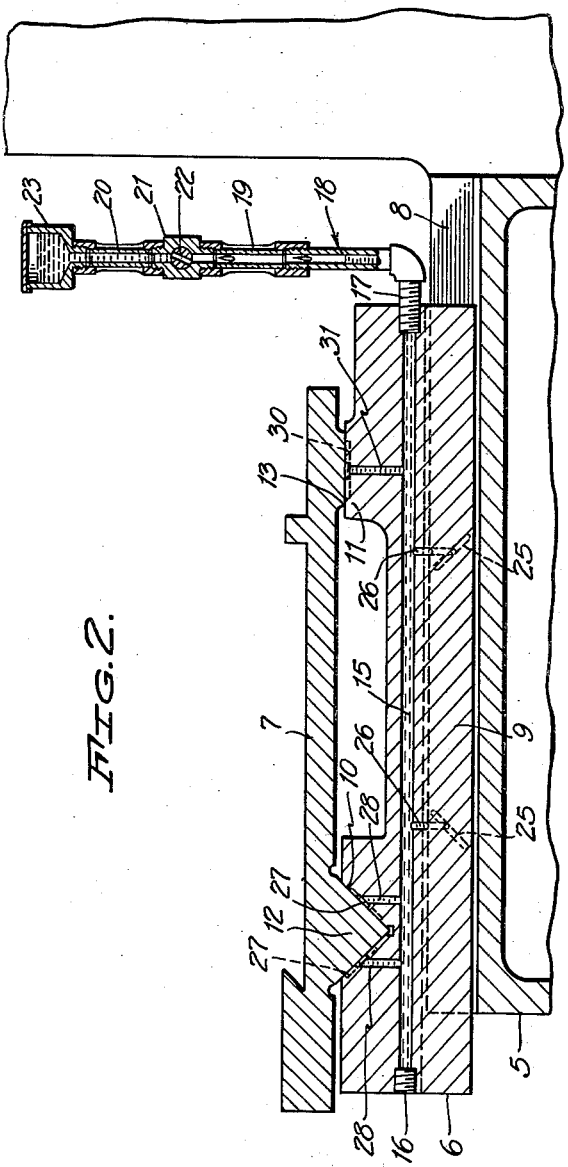

2,411,391

UNITED STATES PATENT OFFICE 2,411,391

LUBRICATING SYSTEM

Ladislaus Robaczynski, Brooklyn, N. Y.

Application April 3, 1943, Serial No. 481,685

6 Claims. (Cl. 184—5)

This invention relates to new and useful improvements in lubricating systems and more particularly it pertains to a lubricating system particularly for use in connection with machines of the general type of planers, grinders and the like wherein the work being operated upon is carried by a bed and is moved thereby relative to the tool or tools which perform the work.

While the invention is herein illustrated in a machine known as a surface grinder, it is to be understood that the invention is also capable of embodiment in other classes of machines and that the embodiment herein employed has been adopted for illustrative purposes only.

In surface grinders of the automatic type, the work operated upon is carried by a bed which moves the work in two directions relative to a grinding element.

In such machines, the work carrying bed consists of two elements commonly termed the saddle and the table.

The table is mounted for sliding movement upon the saddle to move the work relative to the grinding element during the grinding period, while the saddle is mounted for sliding movement upon the frame of the machine for the purpose of moving the work intermittently relative to the grinding element to present successively, new surfaces to be operated upon, to the grinding element. Usually, these two sliding movements are in directions at right angles to each other.

The sliding movements above referred to are obtained by mounting the table and saddle upon trackways in their respective supporting members which trackways are in most instances V-shaped in cross sectional form and in which similarly shaped tracks carried by the members, slide.

Heretofore, lubrication of the trackways and tracks has been accomplished by means of lubricant containing wells formed in the trackways and in which rollers are mounted for engagement with the tracks to pick up lubricant from the wells and apply it to the tracks.

Such systems are not the most desirable since they have many disadvantages which seriously handicap the operations of the machine particularly where work of a high precision nature is required thereof.

In certain of such machines, the wells referred to are not available for refilling without removal of the saddle and bed and therefore are not visible with the result that they are too often not refilled at proper intervals.

Also in such systems, the application of lubricant to the tracks is not controllable with the result that too much lubricant is applied.

The application of too much lubricant to the track does, under certain conditions, change the relative positions of the table and saddle, or saddle and frame, or both, thus impairing a high degree of precision operation.

Furthermore, application of too great an amount of lubricant, causes it to overflow the trackways to other parts of the machine thereby effecting waste of lubricant and unnecessary fouling of the machine.

It is the primary object of the present invention to provide a lubricating system in which the several disadvantages above pointed out are eliminated.

One feature of the invention resides in a novel construction by which the supply of lubricant to the trackways may be at all times under the control of the operator of the machine.

Another feature resides in a novel arrangement of parts whereby the lubricant may be applied without necessitating removal of any of the parts of the machine.

Still another feature of the invention resides in a novel construction and arrangement of parts whereby the operator may at all times ascertain the operative condition of the system.

With the above and other objects in view reference will be had to the following specification and the accompanying drawing, wherein the invention has been illustrated as embodied in a surface grinding machine and wherein, Figure 1 is a fragmentary front elevational view of a surface grinding machine illustrating the invention embodied thereon, and Figure 2 is a transverse vertical sectional view on an enlarged scale taken substantially on the line 2—2 of Figure 1.

Referring more specifically to the drawing, the reference character 5 designates the frame of the machine, the so-called saddle being designated 6, the reference character 7 designating the work supporting table.

The frame is provided at each of its sides with a saddle supporting trackway 8, each of which is substantially V-shaped in cross sectional form, said trackways extending from the front, towards the rear of the machine.

The saddle 6 is provided upon its under face with two substantially V-shaped tracks 9, see Figure 1. These tracks 9 are of a size to fit and have free sliding movement in their respective trackways 8 of the frame 5.

The construction just described provides a slidable mounting upon the frame for the saddle 6 and permits it to be moved intermittently in a direction either to the front or to the rear of the machine to present successively to the grinding element, not shown, new surfaces of the work to be operated upon by the grinding element.

Upon its upper face and at the forward edge thereof, the saddle 6 is provided with a substantially V-shaped trackway 10 and at its rear edge with a flat trackway 11.

The table 7 is provided upon its under face adjacent its front edge with a track 12 which is of substantially V-shaped cross sectional form and of a size to be received within the trackway 10 of the saddle 6 for free sliding movement therein.

Upon its under face adjacent the rear edge thereof, the table 7 is provided with a flat track 13 adapted for sliding engagement with the flat trackway 11 of the saddle 6.

The trackways 10 and 11 and the tracks 12 and 13 are disposed at right angles to the trackways 8 and tracks 9, heretofore described, and they provide for slidably mounting the table 7 upon the saddle 6 for the purpose of providing for movement of the work relative to the grinding element during the grinding operations.

Extending through the saddle 6 longitudinally of each of the tracks 8, there is a passage way 15, each end of which is slightly enlarged and internally threaded as best illustrated in Figure 2 of the drawing.

The forward or outer end of each of the passages 15 is closed by means of a removable plug 16, which has threaded engagement therewith.

Threaded into the rear end of each of the passages 15 there is a short length of pipe 17, and extending upwardly therefrom there is a feed pipe 18. The feed pipe 18 includes two sight sections 19 and 20 spaced from each other by an intermediate valve section 21 having a valve 22 and upon its upper end it has a lubricant receptacle 23.

From the foregoing, it will be apparent that when the valve 22 is opened, lubricant will be free to pass from the receptacle 23 through the feed pipe 18 and into the passage 15 of the saddle.

The sight section 19 provides means by which the operator may ascertain the rate of flow of lubricant through the feed pipe, while the sight section 20 serves, when lubricant is not visible therein, to indicate an absence of lubricant in the receptacle 23.

Formed at suitable spaced intervals in each of the faces of each of the tracks 8 of the saddle 6 there are elongated recesses 25. These recesses extend angularly or obliquely across the faces of the tracks and form pockets or receptacles for containing lubricant.

Lubricant is supplied to these several recesses 25 by means of passages 26 of which there is one leading from each recess to the heretofore mentioned passage 15 of the saddle 6.

Formed at suitably spaced intervals in each of the faces of the trackways 10 of the saddle, there are elongated recesses 27, preferably arranged in pairs with the recesses of each pair preferably arranged in crossed or oblique relation to each other and these recesses 27 also form pockets or receptacles for containing lubricant.

Lubricant is supplied to the several pairs of recesses 27 by means of passages 28 of which there is one leading from each pair of passages to the heretofore mentioned passage 15 of the saddle 6.

Formed at suitably spaced intervals in the face of the flat trackway 11 of the saddle 6, there are elongated transverse recesses 30 which form pockets or receptacles for lubricant and each of these recesses has communication with the passage 15 in the saddle 6 by means of a passage 31.

From the foregoing description it will be apparent that lubricant will be supplied from the passage 15 in the saddle 6 to the contacting faces of the several tracks and trackways as long as a sufficient quantity thereof is maintained in the lubricant receptacle 23.

Since the contacting faces of the trackways and tracks are finished to a highly accurate degree, especially in machines constructed for high precision work, a too free flow of lubricant from the several recesses is prevented by reason of the fact that in each instance, the face of a track or trackway, as the case may be, which is opposed to that face in which the recesses are formed, acts as a partial closure for the recesses and thereby retards, to the desired extent, the flow of lubricant therefrom.

With the valve 22 in closed position, the lubricant receptacle and sight section 20 of the feed pipe 18 may be filled with lubricant. Upon opening the valve 22, the lubricant will flow by gravity to the passage 15 from whence it passes to the several recesses of the tracks and trackways through several passages by which they have communication with the passage 15 of the saddle 6.

When the lubricant has reached the desired level in the system, the valve 22 may be partially closed to retard the flow of lubricant through the feed pipe 18 maintaining it at the proper rate to insure an adequate supply of lubricant to the several tracks and trackways without undue flooding thereof.

Since the entire circulating system is carried by the saddle, the movements of which are slight, the system is not subjected to violent shocks or vibrations and the necessity of flexible connections between parts is entirely eliminated.

From the foregoing, it will be apparent that the present invention provides a structure in which the recited objects and features are obtained.

Having thus described the invention, what is claimed as new is:

1. A lubricating system for lubricating a plurality of machine parts having relative movement through the medium of interengaging tracks and trackways having opposed contacting faces, said system including a plurality of open recesses disposed obliquely in one of said opposed contacting faces the open sides of which recesses are, under operating conditions, closed by the opposed contacting face, and gravity feed means carried by one of the movable machine parts for supplying lubricant to said recesses.

2. A lubricating system for lubricating a plurality of machine parts having relative reciprocating movement in right angular directions through the medium of right angularly disposed tracks and trackways each of which has opposed contacting faces, said system including open recesses disposed obliquely in one of said opposed contacting faces, the open sides of which recesses are, under operating conditions, closed by the opposed contacting face, and gravity operated means carried by one of the movable machine parts for supplying lubricant to each of said recesses.

3. A bed lubricating system for machines of the type in which the bed is movable relative to the frame of the machine, said system including a trackway carried by the machine frame, a track carried by the bed and adapted for sliding engagement with the trackway of the frame, a passage extending longitudinally of the track at a point remote from its trackway engaging face, a plurality of open recesses disposed obliquely in that face of the track which has sliding contact with the face of the trackway whereby the contacting face of the trackway serves, under operating conditions, to close the open side of said recesses, passages extending through the track for establishing communication between the recesses and the aforementioned longitudinal passage through the track, and gravity feed means carried by said bed for supplying lubricant to the longitudinal passage of the track for distribution to said recesses.

4. In a machine of the type described in combination, a supporting frame and a bed, said bed comprising a saddle and a table superimposed upon the frame, a plurality of trackways associated with the frame, a plurality of tracks carried by said saddle for sliding engagement with the frame trackways to support the saddle in sliding relation to the frame, a passage extending longitudinally of each of the said tracks at a location remote from its frame trackway engaging face, a plurality of open recesses disposed obliquely in the trackway engaging faces of each of said tracks which recesses are closed, under operating conditions, by the opposed face of the frame trackways, passages leading through the tracks from the longitudinal passages thereof to the said recesses, a plurality of trackways carried by said saddle, a plurality of tracks carried by the table for sliding contact with the trackways of the saddle to support the table slidably upon the saddle, open lubricant receiving recesses disposed obliquely in the faces of the trackways of the saddle, said recesses being closed under operating conditions by the opposed contacting faces of the tracks carried by the table, passages extending from said recesses to their respective longitudinal passage in the saddle, and gravity feed means carried by said saddle for supplying lubricant to the longitudinal passages of the saddle.

5. In a machine of the type described in combination, a supporting frame and a bed, said bed comprising a saddle and a table superimposed upon the frame, a plurality of trackways associated with the frame, a plurality of tracks carried by said saddle for sliding engagement with the frame trackways to support the saddle in sliding relation to the frame, a passage extending longitudinally of each of the said tracks at a location remote from its frame trackway engaging face, a plurality of open recesses disposed obliquely in the trackway engaging faces of each of said tracks which recesses are closed, under operating conditions, by the opposed face of the frame trackways, passages leading through the tracks from the longitudinal passages thereof to the said recesses, a plurality of trackways carried by said saddle, a plurality of tracks carried by the table for sliding contact with the trackways of the saddle to support the table slidably upon the saddle, open lubricant receiving recesses disposed obliquely in the faces of the trackways of the saddle, said recesses being closed under operating conditions by the opposed contacting faces of the tracks carried by the table, passages extending from said recesses to their respective longitudinal passage in the saddle, and gravity operated means carried by the saddle for supplying lubricant to the longitudinally extending passages thereof.

6. A lubricating system for lubricating a plurality of superposed machine parts having relative movement through the medium of interengaging tracks and trackways having opposed contacting faces, said system including a plurality of open recesses formed in one of said opposed contacting faces the open side of which are, under operating conditions, closed by the opposed contacting face, a horizontal main passage provided in one of the movable parts, a plurality of feed passages leading from the main passage to the recesses, and means for feeding lubricant by gravity to said main passage.

LADISLAUS ROBACZYNSKI.